(12) United States Patent
Ito et al.

(10) Patent No.: US 11,365,807 B2
(45) Date of Patent: Jun. 21, 2022

(54) SEALING APPARATUS

(71) Applicant: NOK CORPORATION, Tokyo (JP)

(72) Inventors: Takuya Ito, Fukushima (JP); Masayuki Tanida, Fukushima (JP)

(73) Assignee: NOK CORPORATION, Tokyo (JP)

( * ) Notice: Subject to any disclaimer, the term of this patent is extended or adjusted under 35 U.S.C. 154(b) by 134 days.

(21) Appl. No.: 16/885,949

(22) Filed: May 28, 2020

(65) Prior Publication Data

US 2020/0292079 A1    Sep. 17, 2020

Related U.S. Application Data

(63) Continuation of application No. PCT/JP2018/048214, filed on Dec. 27, 2018.

(30) Foreign Application Priority Data

Dec. 27, 2017   (JP) .............................. JP2017-250659

(51) Int. Cl.
   *F16J 15/16*       (2006.01)
   *F16J 15/3232*     (2016.01)
   *F16J 15/447*      (2006.01)

(52) U.S. Cl.
   CPC ......... *F16J 15/162* (2013.01); *F16J 15/3232* (2013.01); *F16J 15/447* (2013.01)

(58) Field of Classification Search
   CPC .... F16J 15/00; F16J 15/16; F16J 15/50; F16J 15/52; F16J 15/162; F16J 15/3204;
   (Continued)

(56) References Cited

U.S. PATENT DOCUMENTS 6,004,039 A * 12/1999  Yabe ...................... F16C 19/52
                                                                 277/394
9,623,703 B2 * 4/2017  Shibata ............... F16C 33/7879
                         (Continued)

FOREIGN PATENT DOCUMENTS

| CN | 101044232 A | 9/2007 |
| CN | 202732971 U | 2/2013 |

(Continued)

OTHER PUBLICATIONS

English translation of Written Opinion of the International Search Authority and International Preliminary Report on Patentability for PCT/JP2018/048214, dated Jul. 9, 2020.

(Continued)

*Primary Examiner* — Nathan Cumar
(74) *Attorney, Agent, or Firm* — Greenblum & Bernstein, P.L.C.

(57) ABSTRACT

A sealing apparatus includes a reinforcing ring, an elastic body portion formed of an elastic body having conductivity, and a conductive grease. The elastic body portion includes a base portion, a lip portion which extends from the base portion, and a tension force applying member which is an elastic member in an annular shape. The tension force applying member is mounted on an outer peripheral side of the lip portion at a lip tip end portion to apply a tension force which presses a lip contact end against an outer peripheral surface of a shaft. The conductive grease is applied to at least a portion of an inner peripheral surface of the elastic body portion which faces an inner periphery side.

4 Claims, 11 Drawing Sheets

(58) Field of Classification Search
CPC .. F16J 15/3232; F16J 15/3236; F16J 15/3208; F16J 15/3212; F16J 15/44; F16J 15/447; F16J 15/4472; F16J 15/4474
USPC .......................................................... 277/358
See application file for complete search history.

(56) References Cited

U.S. PATENT DOCUMENTS

| | | | | |
|---|---|---|---|---|
| 9,751,361 | B2* | 9/2017 | Seki | .................. F16C 41/007 |
| 2007/0278748 | A1* | 12/2007 | Matsui | ................ F16C 33/7876 277/549 |
| 2011/0069917 | A1 | 3/2011 | Yamada et al. | |
| 2012/0007316 | A1* | 1/2012 | Terasawa | ............ F16C 33/7886 277/361 |
| 2014/0203514 | A1 | 7/2014 | Colineau et al. | |
| 2018/0058587 | A1 | 3/2018 | Yoshimura et al. | |

FOREIGN PATENT DOCUMENTS

| | | | | |
|---|---|---|---|---|
| EP | 3293424 | A1 | 3/2018 | |
| JP | S63-43067 | A | 2/1988 | |
| JP | H01-195198 | A | 8/1989 | |
| JP | 2559158 | Y2 | 1/1998 | |
| JP | 2000-244180 | A | 9/2000 | |
| JP | 2010-185490 | A | 8/2010 | |
| JP | 2012-72822 | A | 4/2012 | |
| JP | 2014-240676 | A | 12/2014 | |
| JP | 2015-14296 | A | 1/2015 | |
| JP | 2015-207534 | A | 11/2015 | |
| WO | WO2016/181900 | A1 | 11/2016 | |
| WO | WO-2016181900 | * | 11/2016 | ................ F02F 7/00 |
| WO | WO-2016181900 | A1 * | 11/2016 | ................ F02F 7/00 |

OTHER PUBLICATIONS

Chinese Office Action dated Aug. 13, 2021 in counterpart CN application No. 201880079178.6 (along with full machine translation).
Extended European Search Report dated Aug. 27, 2021 in counterpart EP application No. 18893573.8.
Decision of Refusal dated Jun. 7, 2021 in the corresponding JP application No. JP2019-562180 (along with full machine translation).
Notice of Reasons for Refusal, dated Mar. 1, 2021 in corresponding JP application No. 2019-562180 (and full machine translation.).
ISR for PCT/JP2018/048214, dated Apr. 2, 2019.
Written Opinion for PCT/JP2018/048214, dated Apr. 2, 2019.

* cited by examiner

SEALING APPARATUS

CROSS REFERENCE TO RELATED APPLICATIONS

The present application is a continuation application of International Patent Application No. PCT/JP2018/048214 filed on Dec. 27, 2018, which claims the benefit of Japanese Patent Application No. 2017-250659, filed on Dec. 27, 2017. The contents of these applications are incorporated herein by reference in their entirety.

BACKGROUND

Technical Field

The present disclosure relates to a sealing apparatus, and particularly relates to a sealing apparatus preventing oil leakage from an end portion of a rotary shaft in an automobile or the like, and intrusion of dust and the like from the outside.

Background

Recently, the electrification of automobiles has been progressing, and electric automobiles, such as EV (Electric Vehicles) and HV (Hybrid Vehicles) are becoming mainstream. In these electric automobiles, a drive motor is used as a power source so that there may be a case where an induced current generated in this drive motor forms electromagnetic noise, thus adversely affecting an AM radio.

In view of the above, a vehicle power transmission device is proposed where electrical conduction is provided between a casing and a drive shaft by a conductive brush made of metal to form an electrically conductive path for grounding, thus releasing a leak current from an electric motor, which causes high-frequency noise, through the electrically conductive path (For example, see Japanese Patent Application Publication No. 2015-207534).

An electromagnetic noise control device for an electric automobile is also proposed where an oil seal which provides a liquid-tight sealing between a through hole of a housing of an electric motor and a rotary shaft of the electric motor is made of conductive rubber and hence, electrical conduction is provided between the housing of the electric motor and the rotary shaft by the oil seal having conductivity, thus inhibiting generation of noise (For example, see Japanese Patent Application Publication No. 2000-244180).

Further, as a sealing apparatus for a hub bearing, there is a bearing seal where a seal lip member made of a rubber material containing conductive carbon is used to take countermeasures against noise (For example, see Japanese Patent Application Publication No. 2015-14296).

SUMMARY

However, in the above-mentioned vehicle power transmission device of Japanese Patent Application Publication No. 2015-207534, it is necessary to separately add a conductive brush in addition to a bearing and the oil seal. Accordingly, there may be a possibility that the vehicle power transmission device cannot be used when an installation space cannot be ensured.

Further, in the above-mentioned electromagnetic noise control device of Japanese Patent Application Publication No. 2000-244180, for example, when the rotary shaft is eccentric, or the oil seal having conductivity is used for a long period of time so that fatigue is generated at a lip tip end portion which contacts the rotary shaft, the oil seal having conductivity and the rotary shaft are separated from each other. Accordingly, there is a possibility that it becomes difficult to inhibit generation of noise.

Further, in the above-mentioned sealing apparatus of Japanese Patent Application Publication No. 2015-14296, although generation of radio noise can be inhibited, three conductive lip portions are in contact with a hub ring and hence, there has been a demand for further reduction in a sliding resistance.

The present disclosure is related to providing a sealing apparatus which can enhance sealing performance and, at the same time, can reduce a sliding resistance, and can inhibit generation of noise.

In accordance with one aspect of the present disclosure, there is provided a sealing apparatus which is attached between a shaft and an outer-peripheral-side member disposed on an outer peripheral side of the shaft about an axis, and which slidably contacts an outer peripheral surface of the shaft to provide a seal between the shaft and the outer-peripheral-side member. The sealing apparatus includes a reinforcing ring in an annular shape about the axis, an elastic body portion in an annular shape about the axis and a conductive grease. The elastic body portion is attached to the reinforcing ring, is formed of an elastic body, and has conductivity. The elastic body portion includes a base portion, a lip portion which extends from the base portion along the axis, and a tension force applying member which is an elastic member in an annular shape. The lip portion includes a lip tip end portion at a tip end of the lip portion, the lip tip end portion having a lip contact end which is formed such that the lip contact end is capable of contacting the outer peripheral surface of the shaft in a slidable manner on the outer peripheral surface of the shaft. The tension force applying member is mounted on an outer peripheral side of the lip portion at the lip tip end portion to apply a tension force which presses the lip contact end against the outer peripheral surface of the shaft. The conductive grease is applied to at least a portion of an inner peripheral surface of the elastic body portion, the inner peripheral surface being an annular surface which faces an inner periphery side.

In the sealing apparatus according to one aspect of the present disclosure, the tension force applying member is mounted on the lip portion at a position facing away from the lip contact end.

In the sealing apparatus according to one aspect of the present disclosure, the conductive grease is applied to the inner peripheral surface of the elastic body portion such that the conductive grease is present in at least a portion of an inter-lip space which is an annular space formed by the inner peripheral surface of the elastic body portion, and one end of the inter-lip space in a direction of the axis is the lip contact end.

In the sealing apparatus according to one aspect of the present disclosure, a volume of the conductive grease is 30% or more of a capacity of the inter-lip space.

In the sealing apparatus according to one aspect of the present disclosure, the volume of the conductive grease is 40% or more of the capacity of the inter-lip space.

In the sealing apparatus according to one aspect of the present disclosure, the volume of the conductive grease is 30% or more and less than 100% of the capacity of the inter-lip space.

In the sealing apparatus according to one aspect of the present disclosure, the volume of the conductive grease is 40% or more and 80% or less of the capacity of the inter-lip space.

In the sealing apparatus according to one aspect of the present disclosure, the elastic body portion includes at least one dust lip in an annular shape about the axis, and another end of the inter-lip space is a portion of the dust lip.

According to the sealing apparatus of the present disclosure, it is possible to realize the sealing apparatus which can enhance sealing performance and, at the same time, can reduce a sliding resistance, and can inhibit generation of noise.

DESCRIPTION OF EMBODIMENTS

First Embodiment

Hereinafter, a first embodiment of the present disclosure will be described with reference to drawings.

Figure 1:
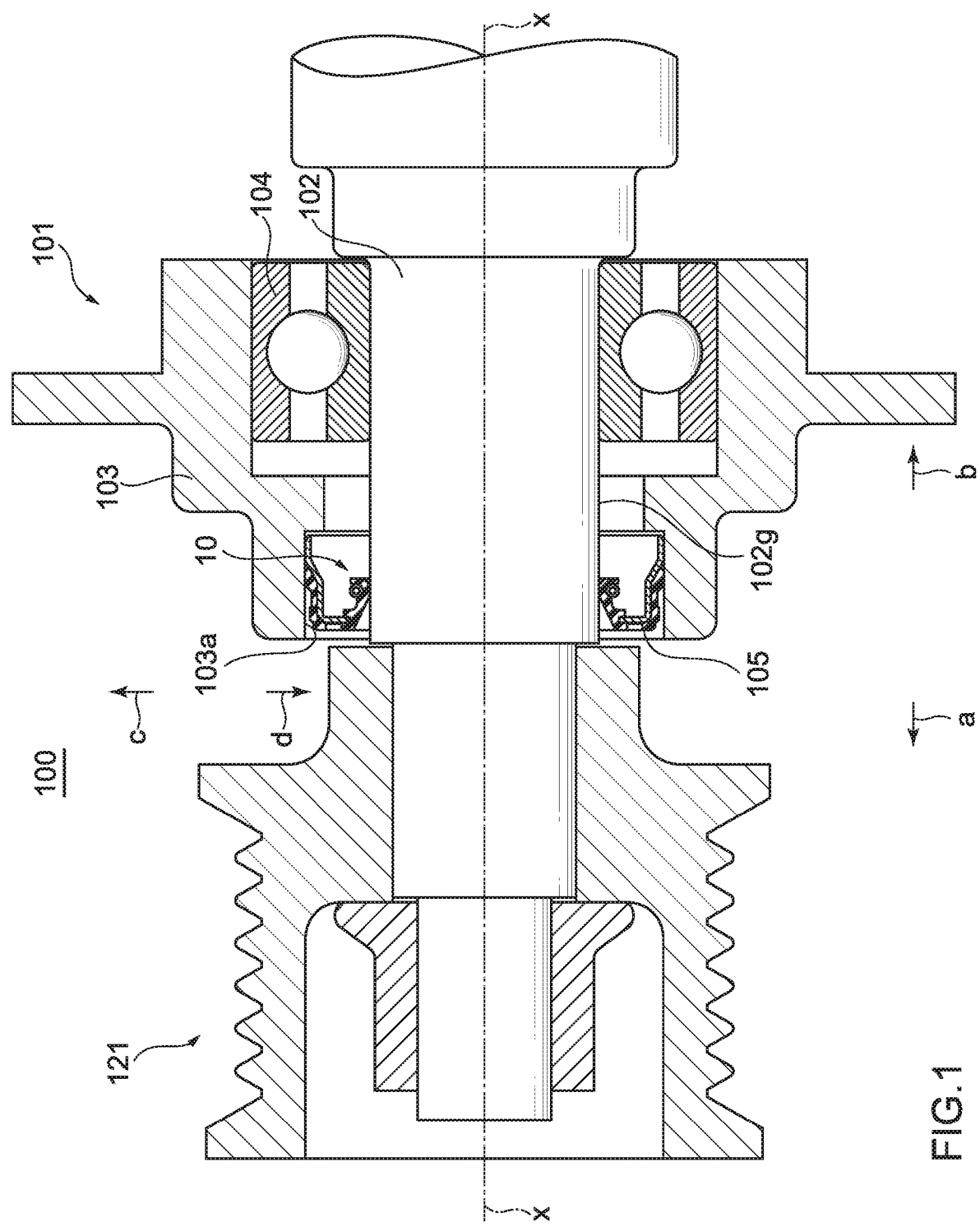
FIG. 1 is a partially enlarged cross-sectional view showing a schematic configuration of a motor driving device for an electric automobile where a sealing apparatus according to a first embodiment of the present disclosure is used.
Figure 2:
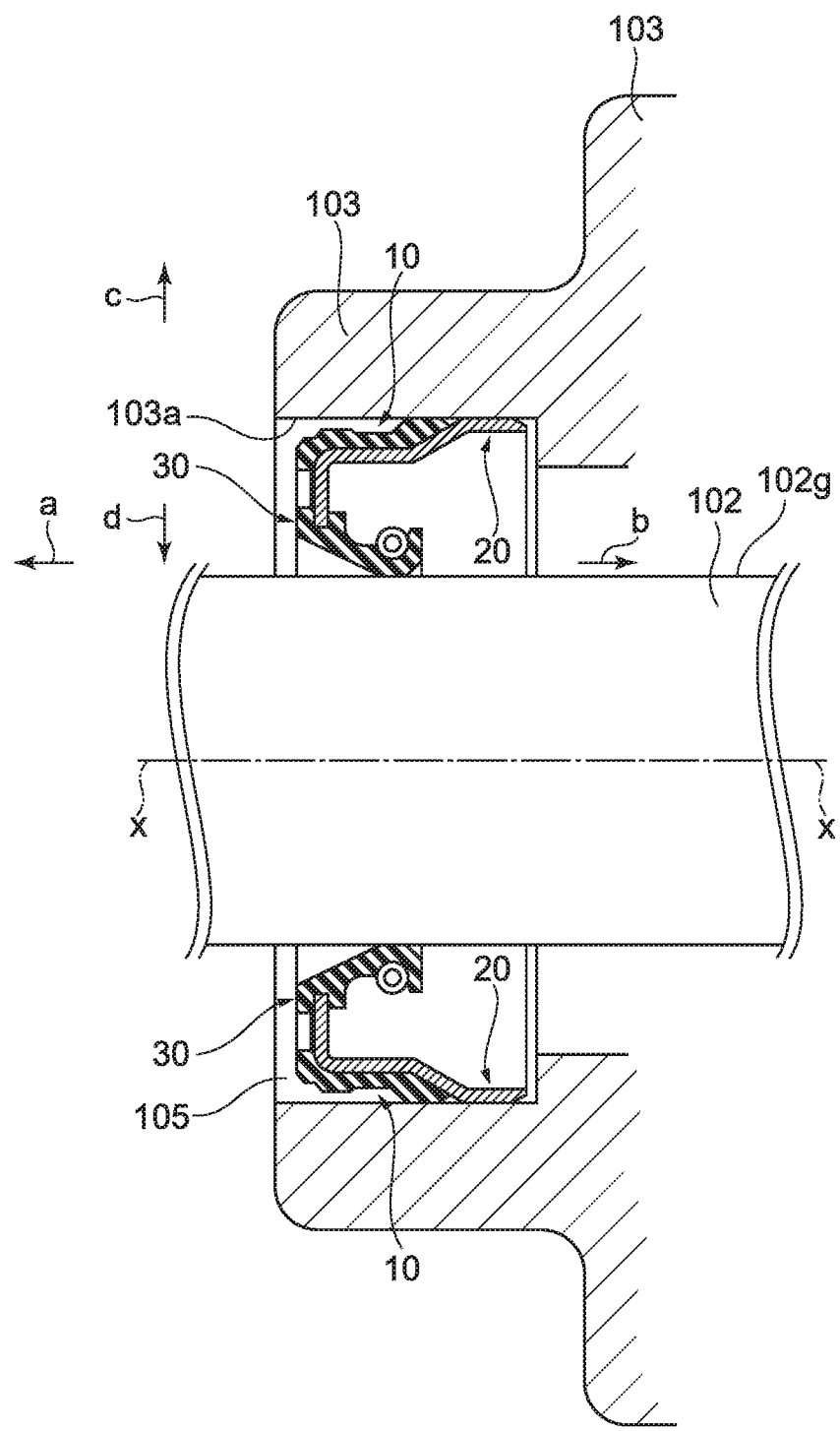
FIG. 2 is a cross-sectional view in a cross section taken along an axis for showing a state where the sealing apparatus according to the first embodiment of the present disclosure is mounted in a gap between an opening portion of a casing and an output shaft.
Figure 3:
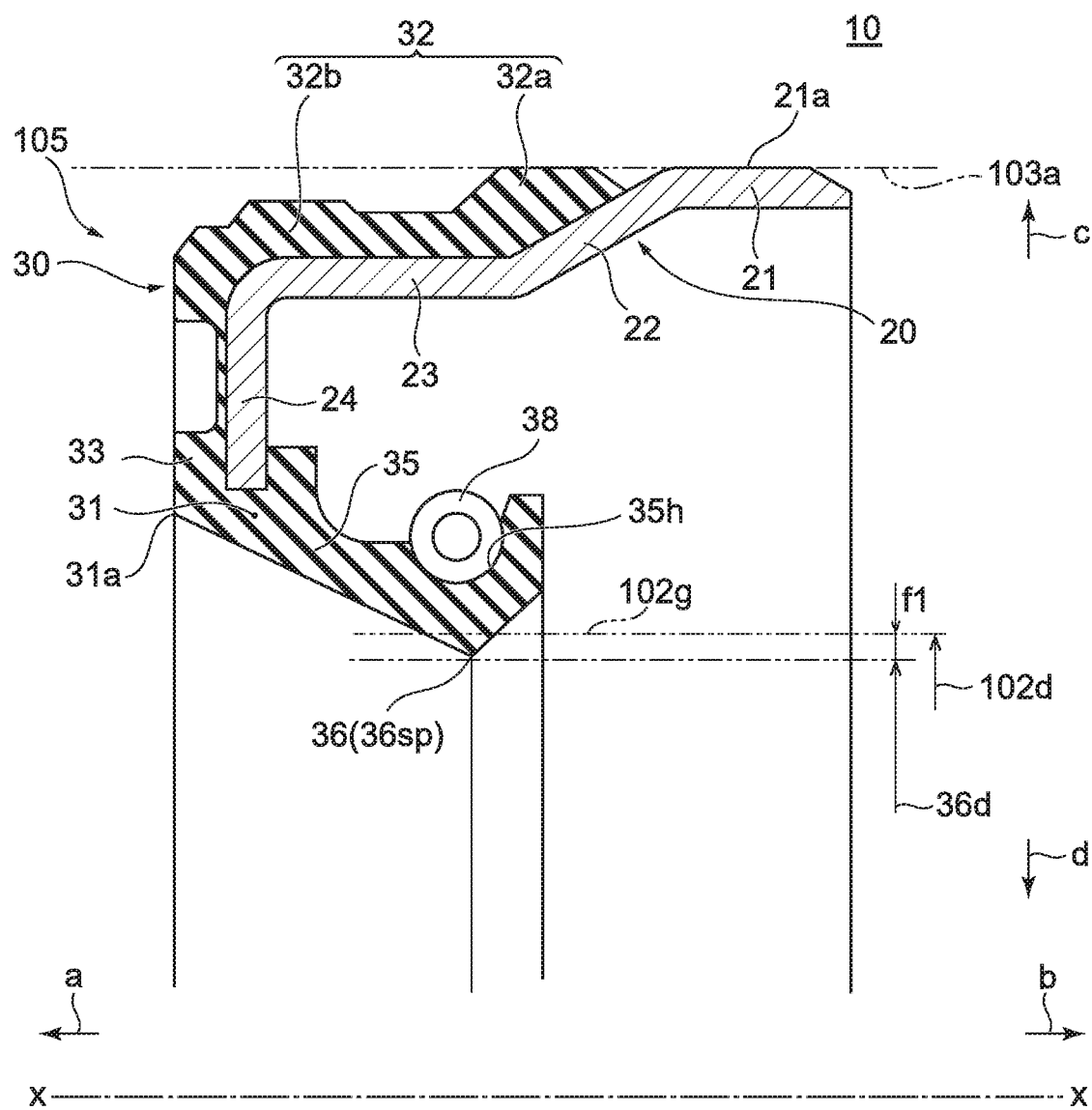
FIG. 3 is a cross-sectional view in a cross section taken along the axis and showing the configuration of the sealing apparatus according to the first embodiment of the present disclosure.

FIG. 1 is a partially enlarged cross-sectional view showing a schematic configuration of a motor driving device 100 for an electric automobile where a sealing apparatus 10 according to the first embodiment of the present disclosure is used. FIG. 2 is a cross-sectional view in a cross section taken along an axis x for showing a state where the sealing apparatus 10 according to the first embodiment of the present disclosure is mounted in a gap between an opening portion 105 of a casing 103 and an output shaft 102. FIG. 3 is a cross-sectional view in a cross section taken along the axis x and showing the configuration of the sealing apparatus 10 according to the first embodiment of the present disclosure.

Hereinafter, for the sake of convenience of the description, the reference symbol "a" side of the sealing apparatus 10 in the drawings is taken as an outer side, and the reference symbol "b" side of the sealing apparatus 10 is taken as a motor inner side. Here, the outer side means an area which is outside of the casing 103 and which is a side where muddy water and the like are present. The motor inner side means the inside of the casing 103. Further, in a direction perpendicular to the axis x (hereinafter, also referred to as "radial direction"), the direction away from the axis x is taken as an outer peripheral side (in the direction indicated by an arrow c), and the direction toward the axis x is taken as an inner periphery side (in the direction indicated by an arrow d).

As shown in FIG. 1, the sealing apparatus 10 according to the first embodiment is particularly applied to the motor driving device 100 for an electric automobile. This motor driving device 100 includes an electric motor 101 which drives a drive wheel, and a pulley 121 which transmits power (rotation) of the output shaft 102, functioning as a shaft of the electric motor 101. The pulley 121 is fixed to the output shaft 102 of the electric motor 101 as an integral body, and a belt not shown in the drawing is attached to the pulley 121 so that power is transmitted to accessories and the like through the belt.

The output shaft 102 of the electric motor 101 is pivotally supported on the casing 103, functioning as an outer-peripheral-side member, via a bearing 104. At the opening portion 105 which allows the output shaft 102 of the motor driving device 100 to project, the sealing apparatus 10 is attached in an annular gap (space) between an inner peripheral surface 103a of the casing 103 made of metal and an outer peripheral surface 102g of the output shaft 102 made of metal, and the sealing apparatus 10 is attached for preventing leakage of a lubricating oil sealed in the casing 103 to the outside and intrusion of dust, such as sand and muddy water, from the outside.

That is, the sealing apparatus 10 is a member which seals an annular gap between the opening portion 105 and the output shaft 102 in transmitting power of the electric motor 101 via the output shaft 102, projecting from the opening portion 105 of the casing 103 of the motor driving device 100.

However, an object to be sealed by the sealing apparatus 10 is not limited to the motor driving device 100 for an electric automobile. The object to be sealed may be any of various motor driving devices, such as a motor drive unit of an in-wheel motor, a motor driving device of a hybrid automobile, a motor driving device of an electric motorcycle, or a motor driving device of an electric bicycle.

As shown in FIG. 2 and FIG. 3, the sealing apparatus 10 is a member fitted in an annular gap between the opening portion 105 of the casing 103 and the output shaft 102. The sealing apparatus 10 includes a reinforcing ring 20 in an annular shape about the axis x of the output shaft 102, and an elastic body portion 30 formed of an elastic body which is integrally attached to the reinforcing ring 20 and which is in an annular shape about the axis x. Here, it is assumed that the axis x of the output shaft 102 is aligned with the axis x of the sealing apparatus 10.

The reinforcing ring 20 is made of a metal material. This metal material may be stainless steel or SPCC (cold rolled steel sheet), for example. Further, the elastic body of the elastic body portion 30 may be various rubber materials, for example. The various rubber materials include synthetic rubber, such as nitrile rubber (NBR), hydrogenated nitrile rubber (H-NBR), acryl rubber (ACM), fluororubber (FKM) and silicone rubber, for example.

The reinforcing ring 20 is manufactured by press working or forging, for example, and the elastic body portion 30 is molded by cross-linking (vulcanization) molding using a mold. In performing this cross-linking molding, the reinforcing ring 20 is disposed in the mold so that the elastic body portion 30 is bonded to the reinforcing ring 20 by cross-linking bonding and hence, the elastic body portion 30 and the reinforcing ring 20 are integrally molded.

In the sealing apparatus 10, the reinforcing ring 20 is a member which is made of metal and which is in an annular shape centered or substantially centered about the axis x. The reinforcing ring 20 is formed such that the reinforcing ring 20 is press fitted on the inner peripheral surface 103a, forming the opening portion 105 of the casing 103, together with the elastic body portion 30, thus being fitted on the inner peripheral surface 103a in a fitted state.

The reinforcing ring 20 includes a cylindrical portion 21 which is a portion positioned on the outer peripheral side (in the direction indicated by the arrow "c") and having a cylindrical shape, a conical annular portion 22 which is an annular portion in a conical cylindrical shape further extending obliquely from an end portion of the cylindrical portion 21 on the outer side (in the direction indicated by the arrow "a") toward the outer side (in the direction indicated by the arrow "a") and the inner periphery side (in the direction indicated by the arrow "d"), a cylindrical portion 23 which is a portion in a cylindrical shape further extending from the end portion of the conical annular portion 22 on the outer side (in the direction indicated by the arrow "a") toward the outer side (in the direction indicated by the arrow "a"), and a disk portion 24 which is a portion in a hollow disk shape extending from the end portion of the cylindrical portion 23 on the outer side (in the direction indicated by the arrow "a") toward the inner periphery side (in the direction indicated by the arrow "d"), for example. The disk portion 24 extends from the end portion of the cylindrical portion 23 on the outer side (in the direction indicated by the arrow "a") toward the inner periphery side (in the direction indicated by the arrow "d"). The extending length of the disk portion 24 is such a length that the disk portion 24 does not reach the outer peripheral surface 102g of the output shaft 102.

An outer peripheral surface 21a of the cylindrical portion 21 is fitted in the opening portion 105 such that the axis x of the sealing apparatus 10 and the axis x of the output shaft 102 are aligned with each other when the sealing apparatus 10 is fitted on the inner peripheral surface 103a, forming the opening portion 105 of the casing 103. The elastic body portion 30 is attached to the reinforcing ring 20 in a manner such that the elastic body portion 30 wraps the reinforcing ring 20 from the outer side (in the direction indicated by the arrow "a") and the outer peripheral side (in the direction indicated by the arrow "c"), and the reinforcing ring 20 reinforces the elastic body portion 30.

The elastic body portion 30 includes a base portion 31 which is positioned in the vicinity of the end portion of the disk portion 24 of the reinforcing ring 20 on the inner periphery side (in the direction indicated by the arrow "d"), a gasket portion 32 which is a portion attached to the cylindrical portion 23 of the reinforcing ring 20 from the outer peripheral side (in the direction indicated by the arrow "c"), a cover portion 33 which is a portion attached to the reinforcing ring 20 from the outer side (in the direction indicated by the arrow "a") between the base portion 31 and the gasket portion 32, and a lip portion 35 which extends from the base portion 31 toward the inner side (in the direction indicated by the arrow "b") along the axis x, and has a lip tip end portion 36 which projects toward the inner periphery side (in the direction indicated by the arrow "d").

The base portion 31 of the elastic body portion 30 is a portion which supports the lip tip end portion 36 of the lip portion 35 such that the lip tip end portion 36 of the lip portion 35 is brought into slide contact with the outer peripheral surface 102g of the output shaft 102 in a pressed state. The base portion 31 of the elastic body portion 30 is also a portion which becomes the center when the lip portion 35 deflects corresponding to a difference between an outer diameter 102d of the output shaft 102 and an inner diameter 36d of the lip tip end portion 36 of the lip portion 35, that is, corresponding to an interference f1.

The gasket portion 32 is formed of a large diameter portion 32a and a small diameter portion 32b. The outer diameter of the large diameter portion 32a is equal to or slightly larger than the inner diameter of the inner peripheral surface 103a, forming the opening portion 105 of the casing 103. Accordingly, when the sealing apparatus 10 is fitted in the opening portion 105 of the casing 103, the large diameter portion 32a of the gasket portion 32 is compressed in a radial direction between the cylindrical portion 23 of the reinforcing ring 20 and the casing 103, thus providing a seal between the inner peripheral surface 103a of the casing 103 which forms the opening portion 105 and the cylindrical portion 23 of the reinforcing ring 20.

With such a configuration, the annular gap formed between the opening portion 105 of the casing 103 and the output shaft 102 is sealed by the sealing apparatus 10. The gasket portion 32 includes the small diameter portion 32b having a smaller diameter than the large diameter portion 32a. However, the gasket portion 32 is not limited to such a configuration, and the large diameter portion 32a may be provided to extend to the outer side (in the direction indicated by the arrow "a") instead of the small diameter portion 32b.

Further, in the elastic body portion 30, the lip portion 35 in an annular shape extends from the base portion 31 toward the inner side (in the direction indicated by the arrow "b") and the inner periphery side (in the direction indicated by the arrow "d"). The lip portion 35 has a conical cylindrical shape where the diameter of the lip portion 35 reduces as progresses toward the inner side (in the direction indicated by the arrow "b") in the axis x direction. That is, in a cross section taken along the axis x (hereinafter, also simply referred to as "cross section"), the lip portion 35 extends from the base portion 31 toward the inner side (in the direction indicated by the arrow "b") and the inner periphery side (in the direction indicated by the arrow "d") obliquely with respect to the axis x. The lip portion 35 is not limited to one which has a conical cylindrical shape. For example, the lip portion 35 may be one where the inner periphery side is formed into a conical cylindrical shape (conical surface shape).

Further, the lip portion 35 includes the lip tip end portion 36, which projects toward the inner periphery side (in the direction indicated by the arrow "d") in a wedge shape, on the tip end side which is away from the base portion 31 toward the inner side (in the direction indicated by the arrow "b"). The lip portion 35 has a recessed part 35h provided on the outer peripheral side (in the direction indicated by the arrow "c") which is the side facing away from the lip tip end portion 36, and a garter spring 38, functioning as a tension force applying member, is mounted in the recessed part 35h.

The lip tip end portion 36 is an annular portion having a wedge shape projecting toward the inner periphery side (in the direction indicated by the arrow "d") in a cross section. The lip tip end portion 36 includes a lip contact end 36sp which slidably contacts the outer peripheral surface 102g of the output shaft 102.

The entire elastic body portion 30 which includes such a lip portion 35 is made of conductive rubber which includes conductive filler, such as carbon black particles or metal powder. Such conductive rubber is rubber which includes conductive filler, and which has a relatively low electric resistance. More specifically, the conductive rubber is rubber formed by mixing a desired amount of an arbitrary rubber material, a desired amount of conductive particle, and a desired amount of conductive fiber. The rubber material may be the above-mentioned nitrile rubber, acryl rubber, fluororubber, silicone rubber or the like, for example. Besides carbon black, a conductive metal oxide may also be used as the conductive particle, such as graphite, indium/tin oxide, or antimony/tin oxide. Further, these materials may be suitably selected. As the conductive fiber, a stainless steel fiber, a carbon fiber (carbon fiber, carbon tube), or a conductive fiber obtained by performing plating on potassium titanate may be used. Further, the thickness and the length of the conductive fiber may be arbitrarily selected.

The garter spring 38 is a spring member made of metal, for example. The garter spring 38 is a member which biases the lip tip end portion 36 toward the inner periphery side (in the direction indicated by the arrow "d") in the radial direction, and which applies a tension force at a predetermined magnitude which presses the lip tip end portion 36 against the outer peripheral surface 102g of the output shaft 102. The garter spring 38 is not limited to a spring made of metal, and may be a spring made of any of various materials, such as a resin.

That is, in the elastic body portion 30, the degree of sealing and a sliding resistance with respect to the outer peripheral surface 102g of the output shaft 102 are decided according to the interference f1 (FIG. 3) of the lip tip end portion 36 with respect to the outer peripheral surface 102g of the output shaft 102, a tension force by the garter spring 38, and followability (following ability) of the lip contact end 36sp of the lip tip end portion 36 with respect to the output shaft 102.

With the above-mentioned configuration, when the sealing apparatus 10 is fitted in the annular gap formed between the opening portion 105 of the casing 103 and the output shaft 102, the lip contact end 36sp of the lip tip end portion 36 of the lip portion 35 of the elastic body portion 30 slidably contacts the outer peripheral surface 102g of the output shaft 102 in a pressed state due to the predetermined interference f1 whereby the sealing apparatus 10 is brought into a usage state.

Even in the case where the output shaft 102 is rotated by the motor driving device 100, the sealing apparatus 10 maintains a state where the lip tip end portion 36 of the lip portion 35 of the elastic body portion 30 tightly contacts the outer peripheral surface 102g of the output shaft 102 due to the interference f1 and a tension force of the garter spring 38. Accordingly, the lip contact end 36sp of the lip tip end portion 36 of the lip portion 35 is pressed against the outer peripheral surface 102g of the output shaft 102, thus sealing a grease, which is an object to be sealed, whereby the sealing apparatus 10 can prevent flowing out of the grease to the outer side (in the direction indicated by the arrow "a").

Further, the sealing apparatus 10 includes the elastic body portion 30 made of conductive rubber so that it is possible to ensure electrical conduction between the output shaft 102 and the casing 103 via the elastic body portion 30. Accordingly, it is possible to release a leak current, which is generated in the motor driving device 100, from the output shaft 102 to the casing 103 through the elastic body portion 30 and hence, generation of noise can be inhibited. In this configuration, the elastic body portion 30 per se has conductivity and hence, it is unnecessary to separately prepare a metal brush or the like to achieve electrical conduction between the output shaft 102 and the casing 103. Therefore, the number of parts can be minimized, thus simplifying the configuration and saving the space can be achieved.

Further, in the sealing apparatus 10, the lip contact end 36sp of the lip tip end portion 36 is pressed against the outer peripheral surface 102g of the output shaft 102 by the tension force of the garter spring 38. Accordingly, a contact state with respect to the outer peripheral surface 102g of the output shaft 102, that is, an electrical conduction state, can be stabilized and hence, generation of noise can be stably reduced.

Specifically, the sealing apparatus 10 is allowed to have eccentric followability where even if the output shaft 102 is eccentric, the lip contact end 36sp of the lip tip end portion 36 of the elastic body portion 30 is stably brought into contact with the outer peripheral surface 102g of the output shaft 102 by the tension force of the garter spring 38. Accordingly, generation of noise can be stably reduced.

Further, in the sealing apparatus 10, even when rubber of the elastic body portion 30 hardens under a low temperature environment of 0° C. or less, for example, the lip contact end 36sp of the lip tip end portion 36 of the elastic body portion 30 can be firmly pressed against the outer peripheral surface 102g of the output shaft 102 by the tension force of the garter spring 38. Accordingly, an electrically conductive state between the output shaft 102 and the casing 103 can be maintained so that generation of noise can be stably reduced.

In the sealing apparatus 10, when fatigue or wear of the lip portion 35 of the elastic body portion 30 is generated after a long time of use, a contact area between the lip contact end 36sp of the lip tip end portion 36 and the outer peripheral surface 102g of the output shaft 102 may partially reduce. Also in such a case, in the sealing apparatus 10, the lip contact end 36sp of the lip tip end portion 36 of the elastic body portion 30 is firmly pressed against the outer peripheral surface 102g of the output shaft 102 by the tension force of the garter spring 38. Accordingly, an electrically conductive state between the output shaft 102 and the casing 103 can be maintained so that generation of noise can be stably reduced.

According to the above-mentioned configuration, in the sealing apparatus 10 of the first embodiment, by applying the tension force of the garter spring 38, a seal can be provided to an outer peripheral surface 102g of the output shaft 102 only by the lip tip end portion 36 of the lip portion 35 with a low sliding resistance. Accordingly, sealing performance can be enhanced and, at the same time, a sliding resistance can be reduced, and generation of noise can be inhibited.

Second Embodiment

Hereinafter, a second embodiment of the present disclosure will be described with reference to drawings.

Figure 4:
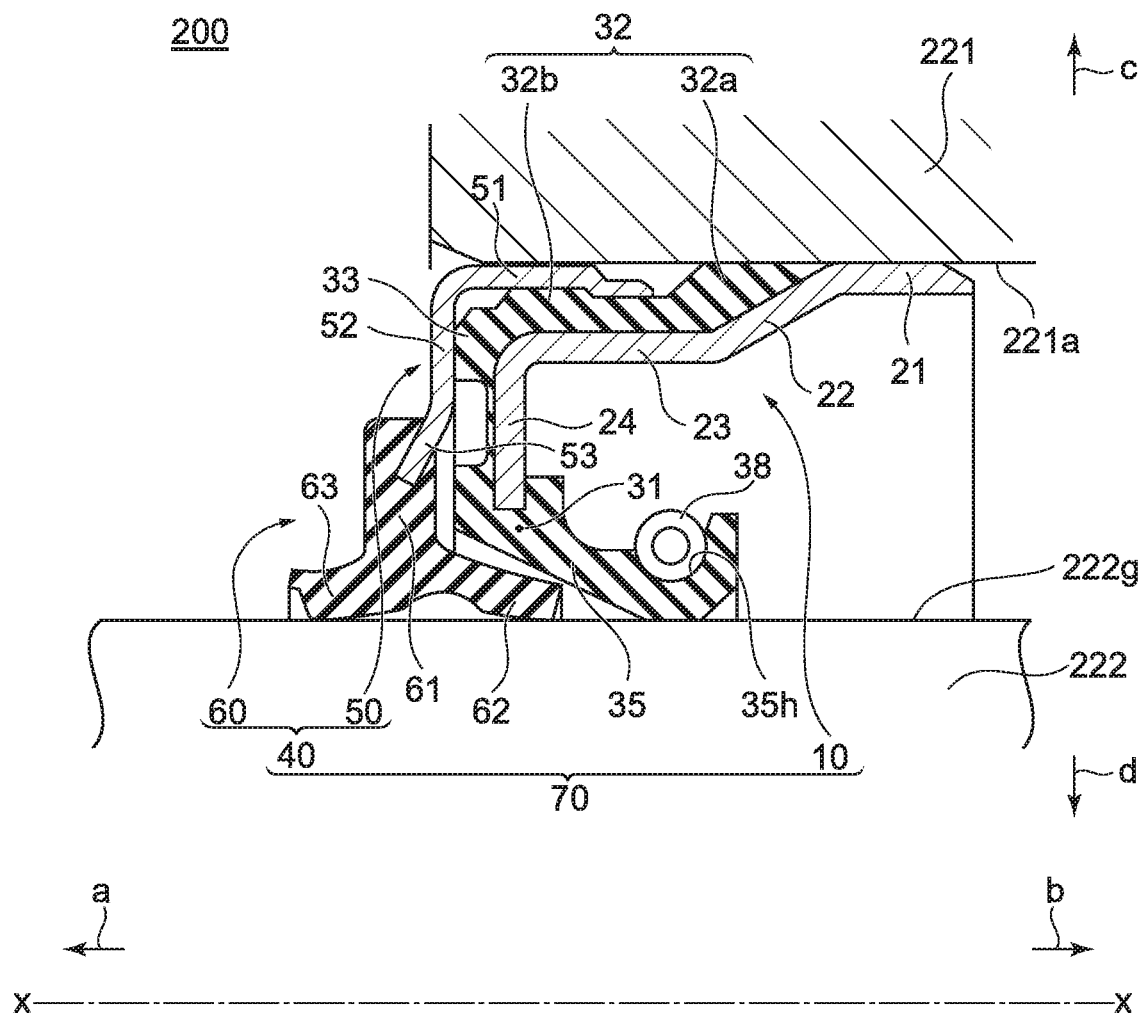
FIG. 4 is a partially enlarged cross-sectional view showing a schematic configuration of a drive system unit of an automobile where a sealing apparatus according to a second embodiment of the present disclosure is used.
Figure 5:
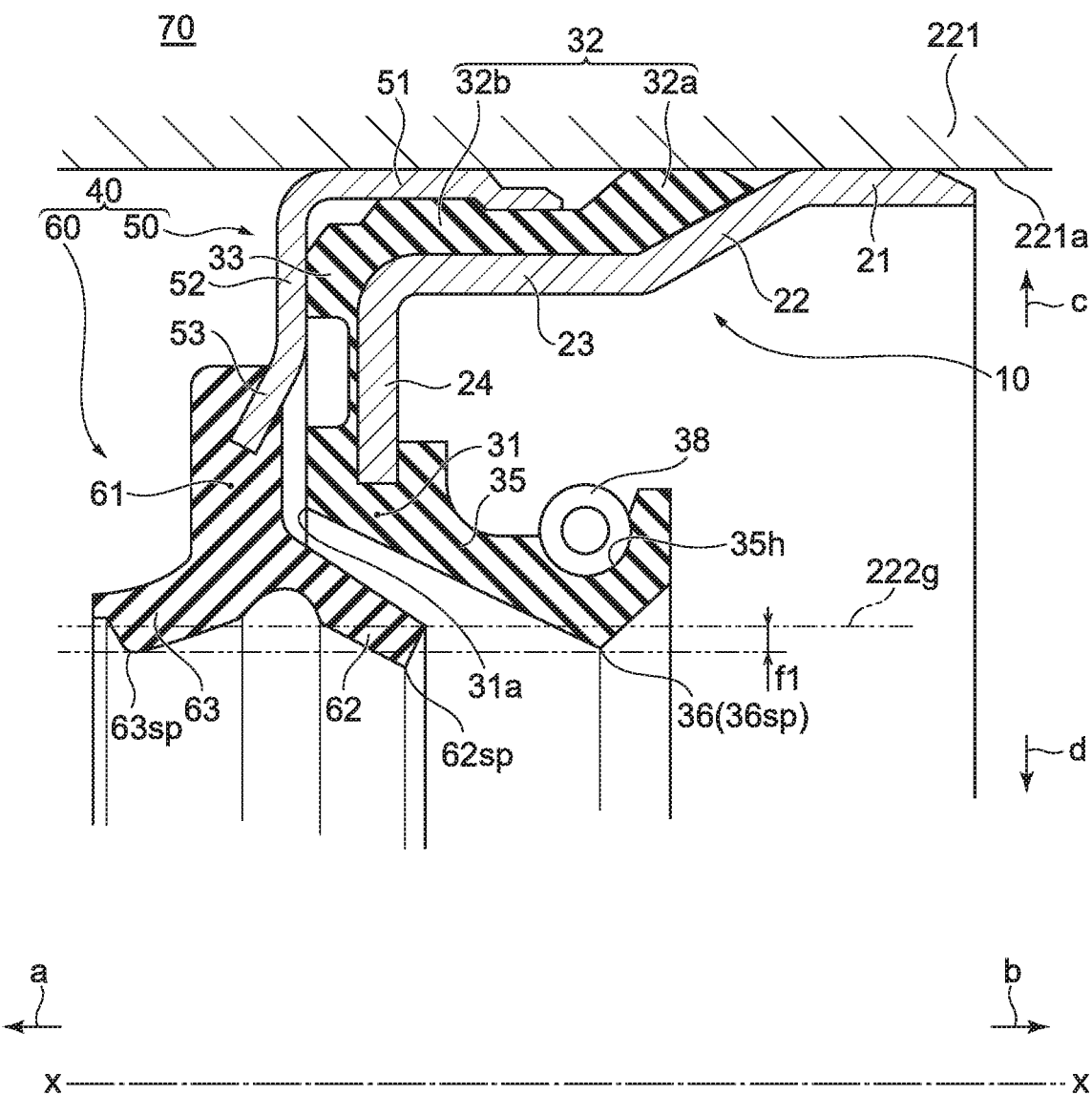
FIG. 5 is a cross-sectional view in a cross section taken along an axis for showing a state where the sealing apparatus according to the second embodiment of the present disclosure is mounted in a gap between a housing and a rotary shaft.
Figure 6:
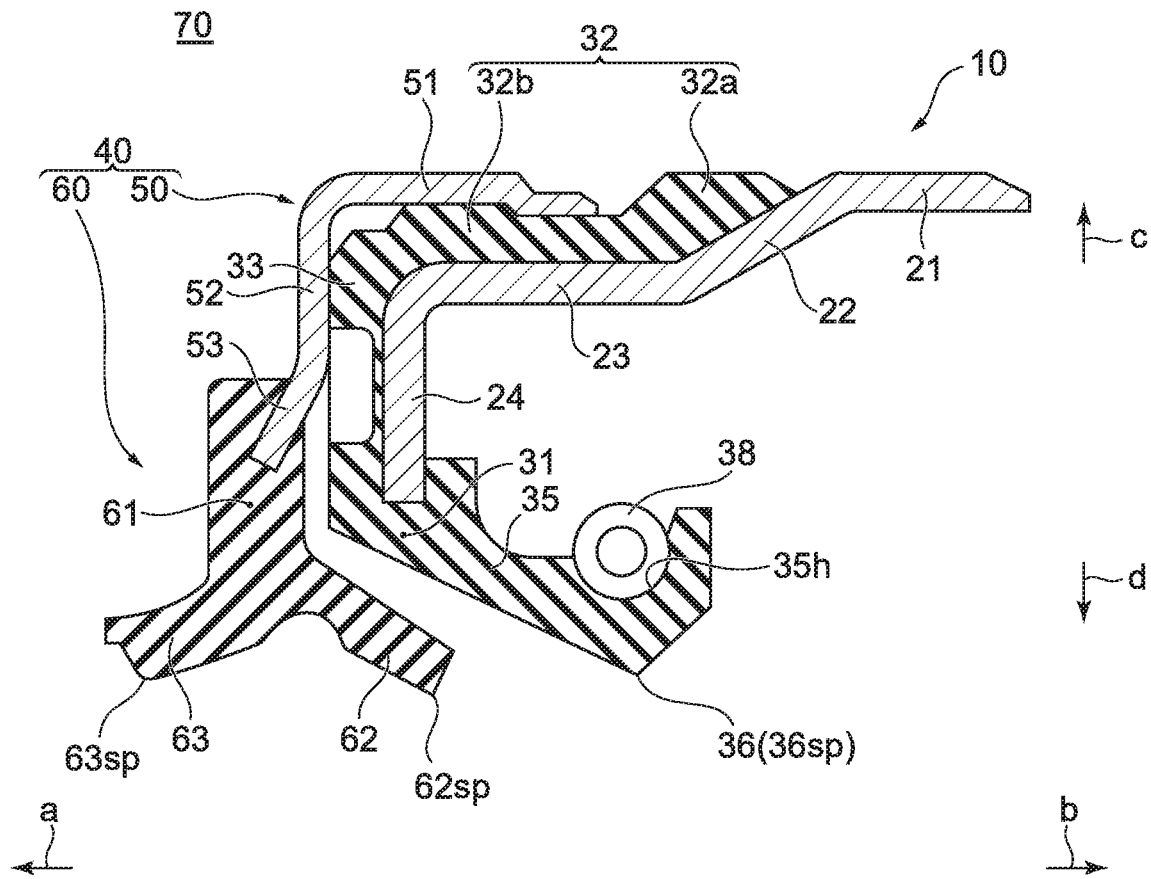
FIG. 6 is A cross-sectional view in a cross section taken along the axis and showing the configuration of the sealing apparatus according to the second embodiment of the present disclosure.

FIG. 4 is a partially enlarged cross-sectional view showing a schematic configuration of a drive system unit 200 of an automobile where a sealing apparatus 70 according to the second embodiment of the present disclosure is used. FIG. 5 is a cross-sectional view in a cross section taken along an axis x for showing a state where the sealing apparatus 70 according to the second embodiment of the present disclosure is mounted in a gap between a housing 221 and a rotary shaft 222. FIG. 6 is a cross-sectional view in a cross section taken along the axis x and showing the configuration of the sealing apparatus 70 according to the second embodiment of the present disclosure.

Hereinafter, for the sake of convenience of the description, the reference symbol "a" side of the sealing apparatus 70 in the drawings is taken as an outer side, and the reference symbol "b" side of the sealing apparatus 70 is taken as an object to be sealed side. Here, the outer side means an area which is outside of the housing 221 and which is a side where muddy water and the like are present. The object to be sealed side means the inside of the housing 221. Further, in a direction perpendicular to the axis x (hereinafter, also referred to as "radial direction"), the direction away from the axis x is taken as an outer peripheral side (in the direction indicated by the arrow "c"), and the direction toward the axis x is taken as an inner periphery side (in the direction indicated by the arrow "d").

As shown in FIG. 4, the sealing apparatus 70 according to the second embodiment is applied to the drive system unit 200 of an automobile. The sealing apparatus 70 is attached in an annular gap (space) between the housing 221 made of metal of the drive system unit 200 and the rotary shaft 222 made of metal, such as a drive shaft, and the sealing apparatus 70 is attached for preventing leakage of a lubricating oil sealed in the housing 221 to the outside and intrusion of dust, such as sand and muddy water, from the outside.

As shown in FIG. 5 and FIG. 6, the sealing apparatus 70 is a member which is fitted in the annular gap between the housing 221 and the rotary shaft 222. The sealing apparatus 70 has a configuration where a dust seal 40 is added to the sealing apparatus 10 of the first embodiment, thus forming an integral body. Here, the sealing apparatus 10 has the same configuration as that of the first embodiment and hence, the description of the sealing apparatus 10 is omitted, and the configuration of the dust seal 40 will be mainly described hereinafter.

The dust seal 40 includes a dust-side reinforcing ring 50 which functions as a reinforcing ring in an annular shape about the axis x of the rotary shaft 222 and a dust-side elastic body portion 60 in an annular shape about the axis x which functions as an elastic body portion formed of an elastic body and is integrally attached to the dust-side reinforcing ring 50. Here, it is assumed that the axis x of the rotary shaft 222 is aligned with the axis x of the sealing apparatus 10 and the dust seal 40.

The dust-side reinforcing ring 50 is made of a metal material. This metal material may be stainless steel or SPCC (cold rolled steel sheet), for example. Further, the elastic body for the dust-side elastic body portion 60 may be various rubber materials in the same manner as the elastic body portion 30 of the sealing apparatus 10, for example, synthetic rubber, such as nitrile rubber (NBR), hydrogenated nitrile rubber (H-NBR), acryl rubber (ACM), or fluororubber (FKM).

The dust-side reinforcing ring 50 is manufactured by press working or forging, for example, and the dust-side elastic body portion 60 is molded by cross-linking (vulcanization) molding using a mold. In performing this cross-linking molding, the dust-side reinforcing ring 50 is disposed in the mold so that the dust-side elastic body portion 60 is bonded to the dust-side reinforcing ring 50 by cross-linking bonding and hence, the dust-side elastic body portion 60 and the dust-side reinforcing ring 50 are integrally molded.

In the sealing apparatus 70, the dust-side reinforcing ring 50 is a member which is made of metal and which is in an annular shape centered or substantially centered about the axis x. The dust-side reinforcing ring 50 is formed such that the dust-side reinforcing ring 50 is press fitted on an inner peripheral surface 221a of the housing 221 in a state of an integral body with the dust-side elastic body portion 60, thus being fitted on the inner peripheral surface 221a in a fitted state.

The dust-side reinforcing ring 50 includes a cylindrical portion 51 which is a portion in a cylindrical shape positioned on the outer peripheral side (in the direction indicated by the arrow "c"), a disk portion 52 in a hollow disk shape which is a portion extending from an end portion of the cylindrical portion 51 on the outer side (in the direction indicated by the arrow "a") toward the inner periphery side (in the direction indicated by the arrow "d"), and a conical annular portion 53 which is an annular portion in a conical cylindrical shape further extending obliquely from an end portion of the disk portion 52 on the inner periphery side (in the direction indicated by the arrow "d") toward the inner periphery side (in the direction indicated by the arrow "d") and the outer side (in the direction indicated by the arrow "a"), for example. The cylindrical portion 51 of the dust-side reinforcing ring 50 is fitted and mounted such that the axis x of the sealing apparatus 70 and the axis x of the rotary shaft 222 are aligned with each other when the sealing apparatus 70 is fitted on an inner peripheral surface 222a of the housing 221.

The dust-side reinforcing ring 50 having such a configuration is attached to partially cover the elastic body portion 30 from the outer side (in the direction indicated by the arrow "a") and the outer peripheral side (in the direction indicated by the arrow "c") of the elastic body portion 30 of the sealing apparatus 10. Specifically, the cylindrical portion 51 of the dust-side reinforcing ring 50 is attached to the gasket portion 32 of the elastic body portion 30, and the disk portion 52 is attached to the cover portion 33 of the elastic body portion 30. The dust-side elastic body portion 60 is integrally attached to this conical annular portion 53 of the dust-side reinforcing ring 50, and the dust-side reinforcing ring 50 supports and reinforces the dust-side elastic body portion 60.

The dust-side elastic body portion 60 includes a base portion 61 in an annular shape which extends in the radial direction at a position in the vicinity of an end portion of the conical annular portion 53 of the dust-side reinforcing ring 50 on the inner periphery side (in the direction indicated by the arrow "d"), and an inner dust lip 62 and an outer dust lip 63 which respectively extend in two directions from the base portion 61. The base portion 61 of the dust-side elastic body portion 60 is the center of the inner dust lip 62 and the outer dust lip 63, and is a body portion which supports these dust lips 62, 63.

The inner dust lip 62 is an annular lip portion which obliquely extends from the base portion 61 toward the inner side (in the direction indicated by the arrow "b") and the inner periphery side (in the direction indicated by the arrow "d"), and which is brought into slide contact with an outer peripheral surface 222g of the rotary shaft 222. The outer dust lip 63 is an annular lip portion which obliquely extends from the base portion 61 toward the outer side (in the direction indicated by the arrow "a") and the inner periphery side (in the direction indicated by the arrow "d"), and which is brought into slide contact with the outer peripheral surface 222g of the rotary shaft 222. That is, the outer dust lip 63 extends in the direction opposite to the inner dust lip 62.

With the above-mentioned configuration, when the sealing apparatus 70 is fitted in the annular gap between the housing 221 and the rotary shaft 222 as shown in FIG. 5, the lip tip end portion 36 of the lip portion 35 of the elastic body portion 30 of the sealing apparatus 10 is pressed against the outer peripheral surface 222g of the rotary shaft 222 due to the predetermined interference f1.

In such a state of the sealing apparatus 70, a lip contact end 62sp of the inner dust lip 62 and a lip contact end 63sp of the outer dust lip 63 of the dust-side elastic body portion 60 of the dust seal 40 are pressed against the outer peripheral surface 222g of the rotary shaft 222 due to the predetermined interference to thereby slidably contact the outer peripheral surface 222g of the rotary shaft 222.

As described above, due to the presence of the inner dust lip 62 and the outer dust lip 63 of the dust-side elastic body portion 60 of the dust seal 40 in addition to the lip tip end portion 36 of the lip portion 35 of the elastic body portion 30 of the sealing apparatus 10, the sealing apparatus 70 can further enhance sealing performance.

Further, in the sealing apparatus 70, the sealing apparatus 10 includes the elastic body portion 30 made of conductive rubber so that it is possible to ensure electrical conduction between the rotary shaft 222 and the housing 221 via the elastic body portion 30. Therefore, it is possible to release a leak current, which is generated in the drive system unit 200, from the rotary shaft 222 to the housing 221 through the elastic body portion 30 and hence, generation of noise can be inhibited. In this configuration, the elastic body portion 30 per se has conductivity and hence, it is unnecessary to separately prepare a metal brush or the like to achieve electrical conduction between the rotary shaft 222 and the housing 221. Therefore, the number of parts can be minimized, thus simplifying the configuration and saving the space can be achieved.

Further, the sealing apparatus 70 is allowed to have eccentric followability where even if the rotary shaft 222 is eccentric, the lip contact end 36sp of the lip tip end portion 36 of the elastic body portion 30 is stably brought into contact with the outer peripheral surface 222g of the rotary shaft 222 by the tension force of the garter spring 38 of the sealing apparatus 10. Accordingly, generation of noise can be stably reduced.

Further, also in the sealing apparatus 70, even when rubber of the elastic body portion 30 of the sealing apparatus 10 hardens under a low temperature environment of 0° C. or less, for example, the lip contact end 36sp of the lip tip end portion 36 of the elastic body portion 30 can be firmly pressed against the outer peripheral surface 222g of the rotary shaft 222 by the tension force of the garter spring 38. Accordingly, an electrically conductive state between the rotary shaft 222 and the housing 221 can be maintained so that generation of noise can be stably reduced.

Further, also in the sealing apparatus 70, when fatigue or wear of the lip portion 35 of the elastic body portion 30 of the sealing apparatus 10 is generated after a long time of use, a contact area between the lip contact end 36sp of the lip tip end portion 36 and the outer peripheral surface 222g of the rotary shaft 222 may partially reduce. Also in such a case, in the sealing apparatus 70, the lip contact end 36sp of the lip tip end portion 36 of the elastic body portion 30 is firmly pressed against the outer peripheral surface 222g of the rotary shaft 222 by the tension force of the garter spring 38. Accordingly, an electrically conductive state between the rotary shaft 222 and the housing 221 can be maintained so that generation of noise can be stably reduced.

According to the above-mentioned configuration, in the sealing apparatus 70 of the second embodiment, a seal is provided by the inner dust lip 62 and the outer dust lip 63 in addition to the lip tip end portion 36 of the lip portion 35 and hence, sealing performance can be enhanced and, at the same time, a sliding resistance can be reduced, and generation of noise can be inhibited.

Third Embodiment

Hereinafter, a third embodiment of the present disclosure will be described with reference to drawings.

Figure 7:
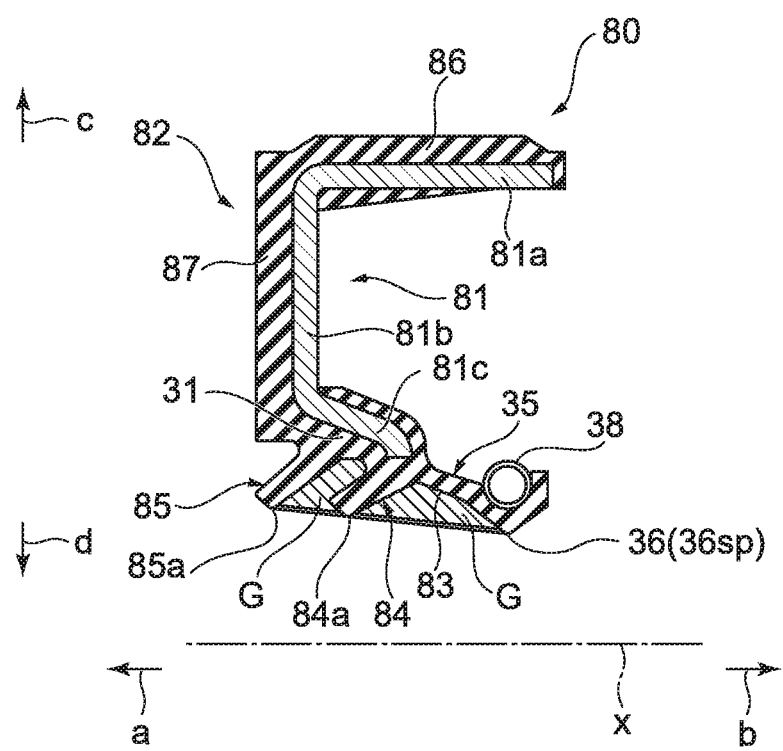
FIG. 7 is a cross-sectional view in a cross section taken along an axis and showing a configuration of a sealing apparatus according to a third embodiment of the present disclosure.

FIG. 7 is a cross-sectional view in a cross section taken along an axis x and showing the configuration of a sealing apparatus 80 according to the third embodiment of the present disclosure. In the same manner as the above-mentioned sealing apparatuses 10, 70, the sealing apparatus 80 according to the third embodiment of the present disclosure is a sealing apparatus which is attached between a shaft and an outer-peripheral-side member which is disposed on the outer peripheral side of this shaft about the axis, and which slidably contacts the outer peripheral surface of shaft to provide a seal between the shaft and the outer-peripheral-side member. Further, in the same manner as the above-mentioned sealing apparatuses 10, 70, the sealing apparatus 80 is applied to any of various motor driving devices, such as the motor driving device 100 for an electric automobile. Hereinafter, components of the sealing apparatus 80 according to the third embodiment of the present disclosure having functions identical or similar to the components of the sealing apparatus 10 according to the first embodiment of the present disclosure are given the same reference symbols, the description of such components is omitted, and portions of the sealing apparatus 80 which differs from the sealing apparatus 10 will be described.

As shown in FIG. 7, the sealing apparatus 80 includes a reinforcing ring 81 in an annular shape about the axis x, an elastic body portion 82 in an annular shape about the axis x which is attached to the reinforcing ring 81 and is formed of an elastic body having conductivity, and a conductive grease G. The elastic body portion 82 includes the base portion 31, the lip portion 35 which extends from the base portion 31 along the axis x, and a tension force applying member 38 which is an elastic member in an annular shape. The lip portion 35 includes the lip tip end portion 36 at the tip end of the lip portion 35. The lip tip end portion 36 has the lip contact end 36sp which is formed such that the lip contact end 36sp is capable of contacting the outer peripheral surface of the shaft in a manner such that the outer peripheral surface (the outer peripheral surface 102g) of the shaft (the output shaft 102) is slidable. As described above, the tension force applying member 38 is mounted on the outer peripheral side of a lip portion 31 of the lip tip end portion 36, and applies a tension force which presses the lip contact end 36*sp* against the outer peripheral surface of the shaft. The conductive grease G is applied to at least a portion of an inner peripheral surface 83 of the elastic body portion 82, the inner peripheral surface 83 being an annular surface which faces the inner periphery side. Hereinafter, the configuration of the sealing apparatus 80 will be specifically described.

As shown in FIG. 7, the reinforcing ring 81 is a member which is made of metal and which is in an annular shape centered or substantially centered about the axis x. For example, the reinforcing ring 81 includes a cylindrical portion 81*a* which is a portion extending in an axis x direction and having a cylindrical shape or a substantially cylindrical shape, a disk portion 81*b* which is a portion in a hollow disk shape extending from an end portion of the cylindrical portion 81*a* on the outer side toward the inner periphery side, and a conical annular portion 81*c* which is a portion extending toward the inner side from an end portion of the disk portion 81*b* on the inner periphery side with inclined toward the inner periphery side. As will be described later, the cylindrical portion 81*a* is formed such that the sealing apparatus 80 can be fitted on the inner peripheral surface 103*a* of a through hole formed in the casing 103, and the cylindrical portion 81*a* can be fitted on the inner peripheral surface 103*a* of the through hole in a contact state via a portion of the elastic body portion 82. As with a portion on the outer peripheral side of a reinforcing ring 21 of the above-mentioned sealing apparatus 1, the cylindrical portion 81*a* may have a shape which forms the cylindrical portion 21, the conical annular portion 22, and the cylindrical portion 23. Alternatively, the cylindrical portion 81*a* may be configured such that a portion of the cylindrical portion 81*a* is brought into direct contact with and fitted on the inner peripheral surface 103*a* of through hole. The reinforcing ring 81 is formed of a material similar to the material for the above-mentioned reinforcing ring 20 in the same manner.

As shown in FIG. 7, the elastic body portion 82 is attached to the reinforcing ring 81, and is integrally formed with a reinforcing ring 10 to cover the reinforcing ring 81. As described above, the elastic body portion 82 includes the base portion 31 and the lip portion 35, and also includes two dust lips 84, 85. The conical annular portion 81*c* of the reinforcing ring 81 enters the inside of the base portion 31. The dust lips 84, 85 obliquely extend from the base portion 31 toward the inner periphery side. The elastic body portion 82 is formed of an elastic body having conductivity which is similar to the elastic body for the elastic body portion 30 of the above-mentioned sealing apparatus 10.

Of the two dust lips 84, 85, the inner dust lip 84 disposed on the inner side extends from the base portion 31 toward the outer side with inclined toward the inner periphery side, and has a conical cylindrical shape or a substantially conical cylindrical shape, for example. The outer dust lip 85 disposed on the outer side of the inner dust lip 84 has a shape substantially equal to the inner dust lip 84. The outer dust lip 85 extends from the base portion 31 toward the outer side with inclined toward the inner periphery side, and has a conical cylindrical shape or a substantially conical cylindrical shape, for example. Each of the inner dust lip 84 and the outer dust lip 85 is formed such that, in a usage state described later, a portion on the tip end side contacts the outer peripheral surface (the outer peripheral surface 102*g*) of the shaft (the output shaft 102). The end portion of the inner dust lip 84 on the inner periphery side is a tip end 84*a*, and the end portion of the outer dust lip 85 on the inner periphery side is a tip end 85*a*. Each of the inner dust lip 84 and the outer dust lip 85 may be formed not to contact the outer peripheral surface (the outer peripheral surface 102*g*) of the shaft (the output shaft 102) in the usage state.

Further, the elastic body portion 82 includes a gasket portion 86 and a cover portion 87. The gasket portion 86 is a portion of the elastic body portion 82 which covers the cylindrical portion 81*a* of the reinforcing ring 81 from the outer peripheral side. As will be described later, the thickness of the gasket portion 86 in the radial direction is set such that, when the sealing apparatus 80 is press fitted in the through hole (the inner peripheral surface 103*a*) of the casing 103, the gasket portion 86 is compressed in the radial direction between the inner peripheral surface 103*a* and the cylindrical portion 81*a* of the reinforcing ring 81 so that a fitting force which is a force toward the radial direction is generated at a predetermined magnitude. The gasket portion 86 may cover the entire outer peripheral side of the cylindrical portion 81*a* as shown in FIG. 7. Alternatively, the gasket portion 86 may cover a portion of the outer peripheral side of the cylindrical portion 81*a* as in the case of the gasket portion 32 of the elastic body portion 30 of the above-mentioned sealing apparatus 10.

Figure 8:
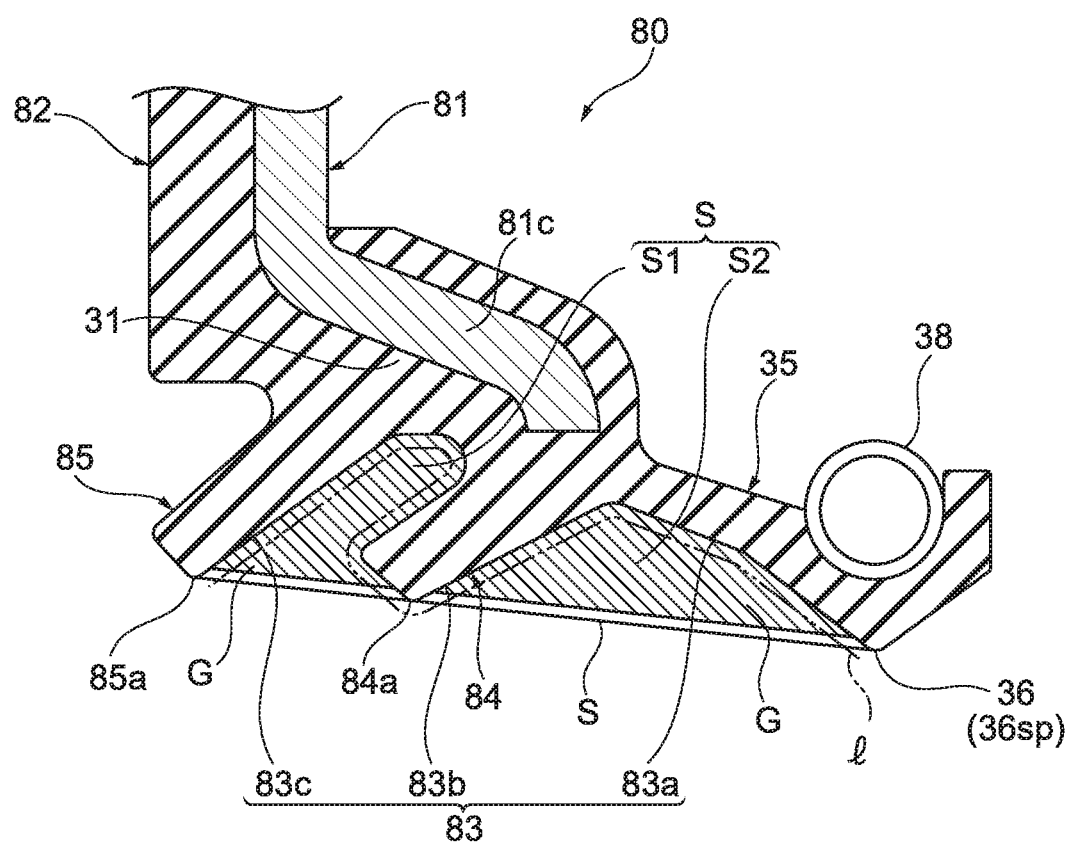
FIG. 8 is a partially enlarged cross-sectional view for showing an inner peripheral surface of an elastic body portion of the sealing apparatus according to the third embodiment of the present disclosure.

The inner peripheral surface 83 is an annular surface of the elastic body portion 82 which faces the inner periphery side. The inner peripheral surface 83 is a surface of the elastic body portion 82 on the inner periphery side which faces a space surrounded by the inner periphery side of the elastic body portion 82 in the radial direction orthogonal to the axis x. The inner peripheral surface 83 is also a front surface which contacts this space on the inner periphery side, and which forms the profile of the elastic body portion 82 on the inner periphery side. In the sealing apparatus 80 according to the present embodiment, as shown in FIG. 8, the inner peripheral surface 83 is a surface formed of an inner peripheral surface 83*a* of the lip portion 35, an inner peripheral surface 83*b* of the inner dust lip 84, and an inner peripheral surface 83*c* of the outer dust lip 85, the inner peripheral surfaces 83*a*, 83*b* and 83*c* extending along an imaginary line 1. The inner peripheral surface 83*a* of the lip portion 35 is a surface of the lip portion 35 which extends along the imaginary line 1 shown in FIG. 8, and which faces the inner periphery side, and the inner peripheral surface 83*a* is a portion of the surface of the lip portion 35 which faces the inner periphery side, the portion being disposed on the outer side from the lip tip end 36*sp*. The inner peripheral surface 83*b* of the inner dust lip portion 84 is an entire surface of the inner dust lip 84 which extends along the imaginary line 1 shown in FIG. 8, and which faces the inner periphery side. The inner peripheral surface 83*c* of the outer dust lip portion 85 is a surface of the outer dust lip 85 which extends along the imaginary line 1 shown in FIG. 8, and which faces the inner periphery side, and the inner peripheral surface 83*c* is a portion of the surface of the outer dust lip 85 which faces the inner periphery side, the portion being disposed on the inner side from the tip end 85*a*.

The conductive grease G is applied to this inner peripheral surface 83. The conductive grease G is applied to the inner peripheral surface 83 such that the conductive grease G is present in at least a portion of an inter-lip space S which is a space formed by the inner peripheral surface 83, and being in an annular shape about the axis x. Specifically, the inter-lip space S is a space formed by surfaces and the inner peripheral surface 83, the surfaces extending between ends disposed adjacent to each other out of ends on the inner periphery side of portions which project toward the inner periphery side of the inner peripheral surface 83. In this embodiment, a space S1 which is surrounded by the inner peripheral surface 83 and a surface (a conical surface or a cylindrical surface) which extends between the lip contact end 36sp of the lip portion 35 and the tip end 84a of the inner dust lip 84, and a space S2 which is surrounded by the inner peripheral surface 83 and a surface (a conical surface or a cylindrical surface) which extends between the tip end 84a of the inner dust lip 84 and the tip end 85a of the outer dust lip 85 form the inter-lip space S.

As described above, the conductive grease G is attached to the inner peripheral surface 83 to fill at least a portion of the inter-lip space S, formed of the space S1 and the space S2. For example, as in the case of an example shown in the drawing, the conductive grease G is attached to the inner peripheral surface 83 not to completely fill the inter-lip space S. The conductive grease G may be attached to the inner peripheral surface 83 to fill a portion of the inter-lip space S, may be attached to the inner peripheral surface 83 to completely fill the inter-lip space S, or may be attached to the inner peripheral surface 83 to overflow from the inter-lip space S. Alternatively, the conductive grease G may be attached to the inner peripheral surface 83 beyond the inter-lip space S.

The conductive grease G may be any grease provided that the conductive grease G includes a conductive substance. A base oil used for the conductive grease G is not particularly limited, and any oil used as the base oil of a lubricating oil may be used. Further, it is sufficient that the conductive substance is a substance having conductivity, and this substance having conductivity is not particularly limited. For the conductive substance, a substance having favorable conductivity is preferable. Further, the conductive substance may be a liquid substance or a solid substance. The conductive substance may be carbon black, for example.

Figure 9:
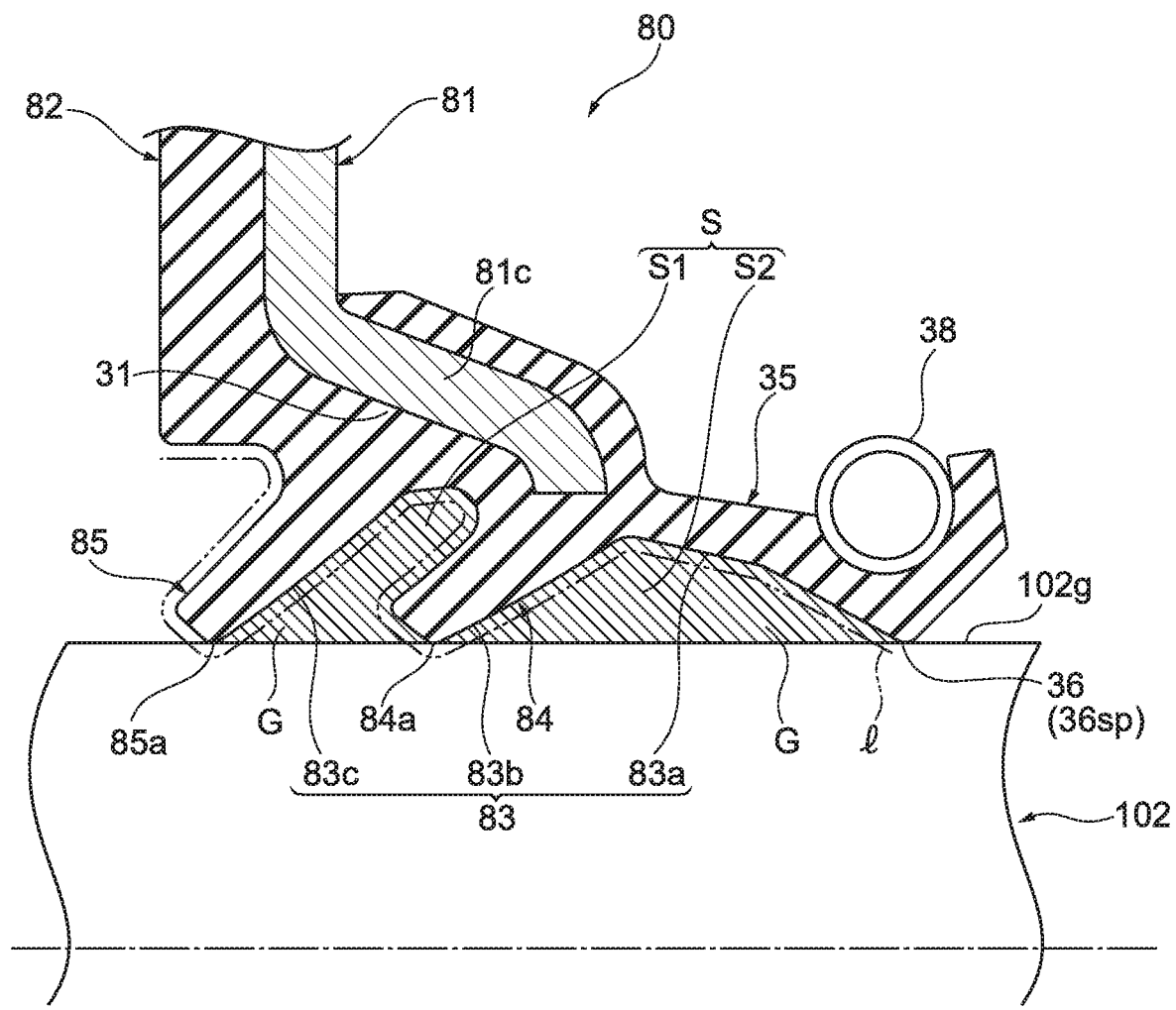
FIG. 9 is a partially enlarged cross-sectional view of a motor driving device where the sealing apparatus according to the third embodiment of the present disclosure is used.

Next, the manner of operation of the sealing apparatus 80 according to the third embodiment of the present disclosure having the above-mentioned configuration will be described. FIG. 9 is a view showing the sealing apparatus 80 in the usage state, and is a partially enlarged cross-sectional view of a motor driving device where the sealing apparatus 80 according to the third embodiment of the present disclosure is used. In FIG. 9, in the same manner as the above-mentioned sealing apparatus 1, the sealing apparatus 80 applied to the motor driving device 100 for an electric automobile is shown.

In the usage state, the lip portion 35, the inner dust lip 84, and the outer dust lip 85 of the elastic body portion 82 are in contact with an outer peripheral surface 102a of the output shaft 102 at portions in the vicinity of the lip contact end 36sp, and the tip ends 84a, 85a, which are respective tip ends of the lip portion 35, the inner dust lip 84, and the outer dust lip 85, thus forming a closed space between the inner peripheral surface 83 and the outer peripheral surface 102a of the output shaft 102. Due to such a contact, the lip portion 35, the inner dust lip 84, and the outer dust lip 85 are deformed so that the inter-lip space S is deformed in the usage state. Accordingly, the capacity of the inter-lip space S in the usage state is smaller than the capacity of the inter-lip space S of the sealing apparatus 80 in a non-attached state where the sealing apparatus 80 is not attached. It may be configured such that, in the usage state, none of the lip portion 35, the inner dust lip 84, and the outer dust lip 85 are deformed, or any of the lip portion 35, the inner dust lip 84, and the outer dust lip 85 is not deformed.

In this embodiment, as described above, the conductive grease G is attached to the inner peripheral surface 83 to fill a portion of the inter-lip space S in the non-attached state so that the volume of the conductive grease G attached to the inner peripheral surface 83 is not larger than the capacity of the inter-lip space S in the usage state. Accordingly, in the usage state, it is possible to prevent with more certainty that the conductive grease G expands so that the volume of the conductive grease G becomes larger than the capacity of the inter-lip space S. Therefore, it is prevented that the lip portion 35 floats, thus releasing the contact between the lip contact end 36sp and the outer peripheral surface 102a of the output shaft 102. In the same manner, it is prevented that the contact between the dust lips 84, 85 and the outer peripheral surface 102a of the output shaft 102 is released. Even if the lip portion 35, the inner dust lip 84, and the outer dust lip 85 are not deformed in the attached state, when the conductive grease G is attached to the inner peripheral surface 83 to fill a portion of the inter-lip space S in the non-attached state, it is possible to obtain the advantageous effect of preventing floating of the lips in the same manner.

As shown in FIG. 9, in the usage state, the conductive grease G attached to the inner peripheral surface 83 electrically connects the inner peripheral surface 83 of the elastic body portion 82 and the outer peripheral surface 102a of the output shaft 102 at portions other than contact portions of the elastic body portion 82 with the output shaft 102, thus achieving electrical conduction. Accordingly, it is possible to form electrically conductive paths between the output shaft 102 and the casing 103 also at the portions other than the contact portions of the elastic body portion 82 with the output shaft 102, thus reducing an electric resistance between the output shaft 102 and the casing 103.

As described above, the sealing apparatus 80 according to the third embodiment of the present disclosure includes the conductive grease G applied to the inner peripheral surface 83 of the elastic body portion 82 in addition to the garter spring 38 and the elastic body portion 82 formed of the elastic body having conductivity. Accordingly, in addition to the advantageous effect obtained by the above-mentioned sealing apparatus 10 according to the first embodiment of the present disclosure, it is possible to reduce an electric resistance between the output shaft 102 and the casing 103 by the conductive grease G interposed between the elastic body portion 82 and the output shaft 102 so that generation of noise can be reduced more stably.

The sealing apparatus 80 according to the third embodiment of the present disclosure includes three lips consisting of the lip portion 35, the inner dust lip 84, and the outer dust lip 85, the conductive grease G is applied to the inner peripheral surface 83 and hence, a sliding resistance can be reduced by lubrication of the grease. Accordingly, it is possible to inhibit an increase in sliding resistance caused by an increase in the number of lips.

Next, conductivity performance of the sealing apparatus 80 according to the third embodiment of the present disclosure will be described.

<Evaluation Test 1>

The inventors of the present disclosure prepared a sealing apparatus (test example 1) which is different from the above-mentioned sealing apparatus 80 according to the third embodiment of the present disclosure, and the above-mentioned sealing apparatuses 80 according to the third embodiment of the present disclosure (test examples 2 to 4) which differ from each other in volume of the conductive grease G applied to the inner peripheral surface 83 of the elastic body portion 82, and an evaluation test for evaluating conductivity performance of these sealing apparatuses was performed. The test example 1 differs from the sealing apparatus 80 according to the third embodiment of the present disclosure with respect to the point that the conductive grease G is not applied to the inner peripheral surface 83. The evaluation test is a test where the sealing apparatus according to the test example 1 to 4 is attached to a testing machine (not shown in the drawing) which brings the sealing apparatus into a usage state shown in FIG. 9, a shaft of the testing machine which corresponds to the output shaft 102 is rotated at each rotational speed described later, and an impedance of the sealing apparatus 80 at an electrically conductive path between a member of the testing machine which corresponds to the housing 103 and the shaft of testing machine is measured. The measurement of the impedance was performed in a room temperature environment. Impedances of the respective test examples 1 to 4 when the rotational speed of the shaft of the testing machine was 0 rpm, 500 rpm, 1000 rpm, 1500 rpm, and 2000 rpm were measured respectively.

In the test example 2, the volume of the conductive grease G applied to the inner peripheral surface 83 of the elastic body portion 82 was set to 20% of the capacity of the inter-lip space S. In the test example 3, the volume of the conductive grease G applied to the inner peripheral surface 83 of the elastic body portion 82 was set to 40% of the capacity of the inter-lip space S. In the test example 4, the volume of the conductive grease G applied to the inner peripheral surface 83 of the elastic body portion 82 was set to 80% of the capacity of the inter-lip space S. As described above, in the test example 1, the conductive grease G is not applied to the inner peripheral surface 83 so that the volume of the conductive grease G applied to the inner peripheral surface 83 of the elastic body portion 82 is 0% of the capacity of the inter-lip space S.

Figure 10:
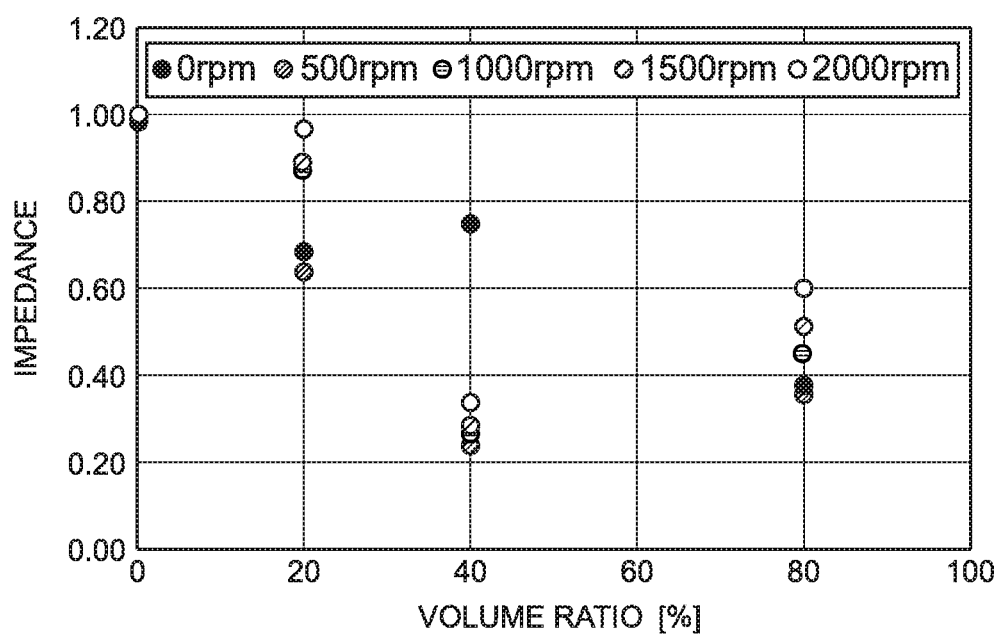
FIG. 10 is a view showing test results of an evaluation test for conductivity performance of the sealing apparatus according to the third embodiment of the present disclosure.

The test results of this evaluation test are shown in Table 1 and FIG. 10.

TABLE 1

|  |  | Test example | | | |
|---|---|---|---|---|---|
|  |  | 1 | 2 | 3 | 4 |
|  |  | Volume ratio (%) | | | |
|  |  | 0 | 20 | 40 | 80 |
| Impedance | 0 rpm | 1.00 | 0.69 | 0.75 | 0.38 |
|  | 500 rpm | 1.00 | 0.64 | 0.24 | 0.36 |
|  | 1000 rpm | 1.00 | 0.87 | 0.26 | 0.45 |
|  | 1500 rpm | 1.00 | 0.89 | 0.29 | 0.51 |
|  | 2000 rpm | 1.00 | 0.97 | 0.33 | 0.60 |

The volume ratio shown in Table 1 and FIG. 10 is a ratio of the volume of the conductive grease G to the capacity of the inter-lip space S (G/S×100). Further, in Table 1 and FIG. 10, the values of impedance are relative values of values of impedance of the test examples 2 to 4 at respective rotational speeds with respect to corresponding values of impedance of the test example 1 at respective rotational speeds (impedance of the test example 2 to 4/impedance of the test example 1).

As shown in Table 1 and FIG. 10, at each rotational speed of the shaft, the impedance of the test example 2 to 4 was lower than the corresponding impedance of the test example 1. As described above, it can be understood that the sealing apparatus 80 according to the third embodiment of the present disclosure can reduce the impedance at the electrically conductive path, thus enhancing conductivity performance.

Further, as shown in Table 1 and FIG. 10, under test conditions where the rotational speed of the shaft of the testing machine is 500 rpm, 1000 rpm, 1500 rpm, and 2000 rpm, the impedances of the test example 3 (the volume ratio of 40%) are significantly lower than the impedances of the test example 2 (the volume ratio of 20%). The impedances of the test example 4 (the volume ratio of 80%) are also lower than the impedances of the test example 2 (the volume ratio of 20%). Accordingly, it is considered preferable that the volume ratio of the conductive grease G is a volume ratio equal to or more than a volume ratio between the test example 2 and the test example 3, and it is considered preferable that the amount of the conductive grease G is the amount at which the volume ratio becomes 30% or more. It is also considered preferable that the amount of the conductive grease G is the amount at which the volume ratio becomes 40% or more. By taking into account the prevention of releasing of the contact of the lips (opening of the lips) caused by the above mentioned expansion of the conductive grease G, it is considered preferable that the amount of the conductive grease G is the amount at which the volume ratio becomes smaller than 100%. Further, by taking into account the deformations of the lips, it is considered preferable that the amount of the conductive grease G is the amount at which the volume ratio becomes 80% or less.

<Evaluation Test 2>

The inventors of the present disclosure also prepared a sealing apparatus (test example 5) which is different from the above-mentioned sealing apparatus 80 according to the third embodiment of the present disclosure, and the sealing apparatus 80 according to the third embodiment of the present disclosure (test example 6), and an evaluation test for evaluating a change in conductivity performance over time of these sealing apparatuses was performed. The test example 5 differs from the sealing apparatus 80 according to the third embodiment of the present disclosure with respect to the point that the garter spring 38 is not attached. In the same manner as the above-mentioned evaluation test 1, the evaluation test is a test where the sealing apparatus according to the test example 5, 6 is attached to a testing machine (not shown in the drawing) which brings the sealing apparatus into a usage state shown in FIG. 9, and the impedance of the sealing apparatus (the test example 5, 6) is measured at predetermined elapsed time intervals. Further, a change in impedance during rotation where the shaft of the testing machine is rotated at 1500 rpm, and a change in impedance in a stopped state where the shaft of the testing machine is not rotated were measured. The measurement of an impedance was performed after 24 hours, after 100 hours, after 150 hours, and after 200 hours from the start of the test.

Figure 11A:
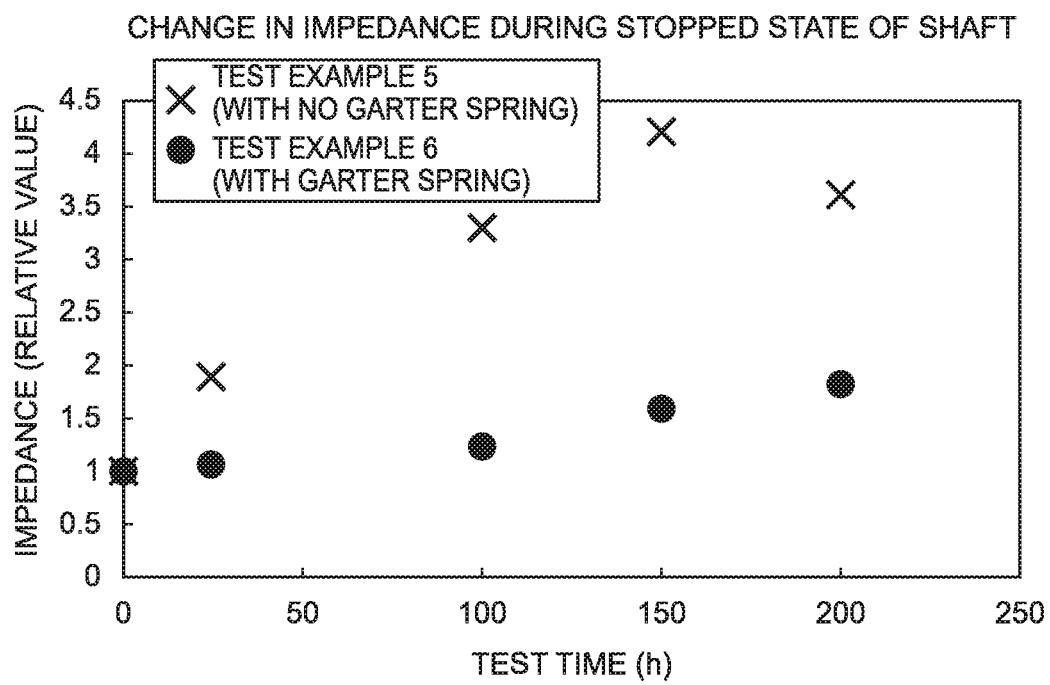
FIGS. 11A and 11B are views showing test results of another evaluation test for conductivity performance of the sealing apparatus according to the third embodiment of the present disclosure.
Figure 11B:
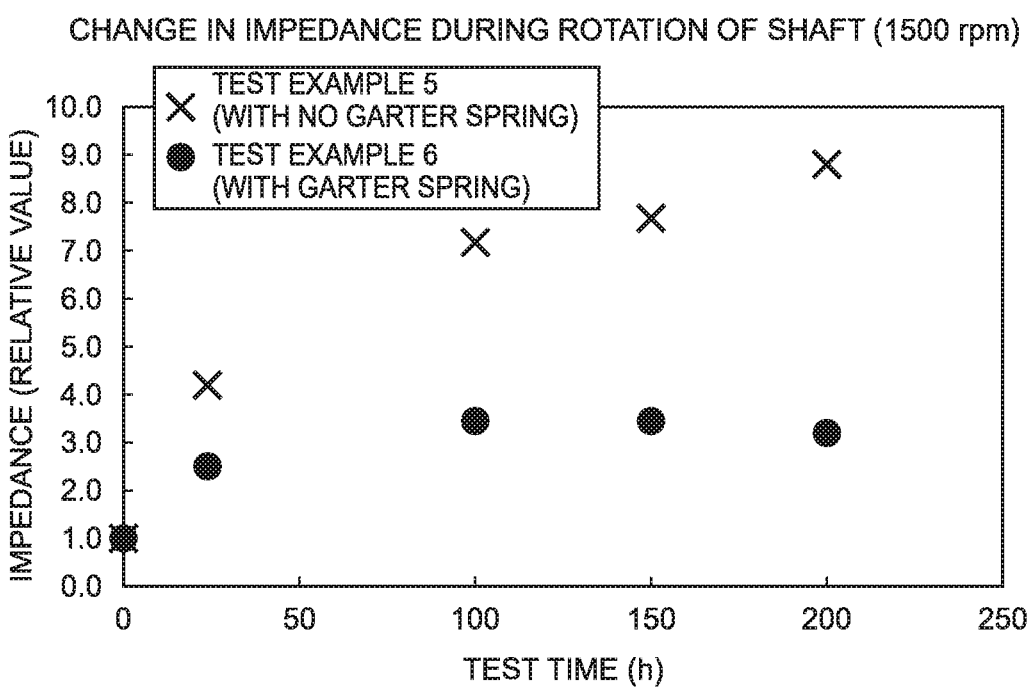

Test results of this evaluation test are shown in Tables 2, 3 and FIGS. 11A, 11B. Table 2 and FIG. 11A are the test results under the test conditions where the shaft is not rotated, and Table 3 and FIG. 11B are the test results under the test conditions where the shaft is rotated at the rotational speed of 1500 rpm.

TABLE 2

|  |  | Impedance | |
|---|---|---|---|
| Test time (h) | Rotational speed (rpm) | Test example 5 | Test example 6 |
| 0 | 0 | 1 | 1 |
| 24 |  | 1.9 | 1.1 |
| 100 |  | 3.3 | 1.2 |
| 150 |  | 4.2 | 1.6 |
| 200 |  | 3.6 | 1.8 |

TABLE 3

| Test time (h) | Rotational speed (rpm) | Impedance | |
|---|---|---|---|
| | | Test example 5 | Test example 6 |
| 0 | 1500 | 1 | 1 |
| 24 | | 4.2 | 2.5 |
| 100 | | 7.2 | 3.4 |
| 150 | | 7.7 | 3.4 |
| 200 | | 8.8 | 3.2 |

In Tables 2, 3 and FIGS. 11A, 11B, the values of impedance of the respective test examples under the respective test conditions are relative values in the same manner as the above-mentioned evaluation test 1, and are relative values of values of impedance with respective test times (24, 100, 150, 200) with respect to the value of impedance with a test time of 0 (impedance with test time of 24 to 200/impedance with test time of 0).

As shown in Table 2 and FIG. 11A, during the stopped state of the shaft, a change with elapsed time (change over time) in impedance of the test example 6 which is the sealing apparatus 80 according to the third embodiment of the present disclosure including the garter spring 38 is smaller than a change with elapsed time in impedance of the test example 5 without the garter spring 38. In the same manner, as shown in Table 3 and FIG. 11B, during the rotation of the shaft (the rotational speed of 1500 rpm), a change with elapsed time in impedance of the test example 6 including the garter spring 38 is smaller than a change with elapsed time in impedance of the test example 5 without the garter spring 38.

From the above-mentioned evaluation test 2, it can be understood that the sealing apparatus 10, 70, 80 including the garter spring 38 can reduce a change in impedance over time in the usage state compared with the sealing apparatus without the garter spring 38. As described the above, the sealing apparatus 10, 70, 80 according to the first to third embodiment of the present disclosure including the garter spring 38 can reduce a change in impedance with lapse of time at an electrically conductive path so that an increase in impedance over usage time can be inhibited, thus inhibiting lowering of conductivity performance with lapse of time.

In the above-mentioned sealing apparatus 80 according to the third embodiment of the present disclosure, the elastic body portion 82 includes the two dust lips 84, 85. However, the elastic body portion 82 may include only one dust lip or three or more dust lips. Alternatively, the elastic body portion 82 may not include the dust lip. In the case where the elastic body portion 82 includes two or more dust lips, the inner peripheral surface 83 may be an inner peripheral surface of the elastic body portion 82 which extends from the lip contact end 36sp of the lip portion 35 to a tip end of a dust lip on the outermost side, or may be an inner peripheral surface of the elastic body portion 82 which extends from the lip contact end 36sp of the lip portion 35 to a tip end of a dust lip at an intermediate portion disposed on the inner side of the dust lip disposed on the outermost side. Alternatively, the inner peripheral surface 83 may be the inner peripheral surface of the elastic body portion 82 between a dust lip and another dust lip. For example, in the sealing apparatus 80, the inner peripheral surface 83 is formed of the inner peripheral surfaces 83a, 83b, 83c. However, the inner peripheral surface 83 may be a surface formed of the inner peripheral surface 83a and a portion of the inner peripheral surface 83b on the inner side of the tip end 84a. Alternatively, the inner peripheral surface 83 may be a surface formed of the inner peripheral surface 83c and a portion of the inner peripheral surface 83b on the outer side of the tip end 84a. Further, the inner peripheral surface 83 is not necessarily be a continuous surface, but may be a surface interrupted. The inner peripheral surface 83 may be terminated between the lip contact end 36sp and the tip end of the dust lip, or may be terminated between the tip end of the dust lip and the tip end of the dust lip.

Another Embodiment

The first to third embodiments of the present disclosure have been described heretofore. However, the present disclosure is not limited to the sealing apparatuses 10, 70, 80 according to the first to third embodiments, and includes any mode which falls within the concept and Claims of the present disclosure. Further, the respective configurations may be selectively combined as desired to solve or provide at least part of the above-described problems or effects. For example, the shape, the material, the arrangement, the size and the like of the respective components in the above-mentioned embodiments may be suitably changed depending on a specific use mode of the disclosure.

For example, in the second embodiment, the dust-side elastic body portion 60 of the dust seal 40 includes two dust seals 62, 63. However, the dust-side elastic body portion 60 may include either one of the inner dust seal 62 or the outer dust seal 63, or may include another dust seal in addition to the inner dust seal 62 and the outer dust seal 63, thus including three or more dust seals. Further, in the second embodiment, it may be configured such that a deflector in an annular shape is attached to the rotary shaft 222, and this deflector and a dust seal which forms a labyrinth seal are formed in the dust-side elastic body portion 60.

In the above-mentioned second embodiment, the elastic body portion 30 of the sealing apparatus 10 in the sealing apparatus 70 is made of conductive rubber, but the dust-side elastic body portion 60 of the dust seal 40 is not made of conductive rubber. However, the present disclosure is not limited to such a configuration. The dust-side elastic body portion 60 may also be made of conductive rubber the same as the elastic body portion 30. In this case, more preferable electrically conductive state can be ensured.

Further, the sealing apparatus 10 according to the first embodiment of the present disclosure may include the conductive grease G of the sealing apparatus 80 according to the third embodiment of the present disclosure. In addition, the sealing apparatus 70 according to the second embodiment of the present disclosure may include the conductive grease G of the sealing apparatus 80 according to the third embodiment of the present disclosure. In this case, in the sealing apparatus 10, the inner peripheral surface of the elastic body portion 30 which corresponds to the inner peripheral surface 83 of the elastic body portion 82 of the sealing apparatus 80 is a surface facing a space on the inner periphery side between the lip contact end 36sp and an outer end 31a (see FIG. 3), which is an end portion of the base portion 31 on the outer side. Further, in the sealing apparatus 70, the inner peripheral surface which corresponds to the inner peripheral surface 83 of the elastic body portion 82 of the sealing apparatus 80 is, in the same manner, a surface facing a space on the inner periphery side between the lip contact end 36sp of the elastic body portion 30 and the outer end 31a of the base portion 31 (see FIG. 5). In the case where the dust-side elastic body portion 60 of the dust seal 40 is formed of an elastic body having conductivity, a surface facing a space on the inner periphery side between the lip contact end 62sp of the dust-side elastic body portion 60 and the lip contact end 63sp also forms the inner peripheral surface 83.

What is claimed is:

1. A sealing apparatus which is attached between a shaft and an outer-peripheral-side member disposed on an outer peripheral side of the shaft about an axis, and which slidably contacts an outer peripheral surface of the shaft to provide a seal between the shaft and the outer-peripheral-side member, the sealing apparatus comprising:

a reinforcing ring in an annular shape about the axis;

an elastic body portion in an annular shape about the axis, which is attached to the reinforcing ring, and formed of an elastic body which has conductivity; and a conductive grease, wherein the elastic body portion includes a base portion, a lip portion which extends from the base portion along the axis, and a tension force applying member which is an elastic member in an annular shape, the lip portion includes a lip tip end portion at a tip end of the lip portion, the lip tip end portion having a lip contact end which is formed such that the lip contact end is capable of contacting the outer peripheral surface of the shaft in a slidable manner on the outer peripheral surface of the shaft, the tension force applying member is mounted on an outer peripheral side of the lip portion at the lip tip end portion to apply a tension force which presses the lip contact end against the outer peripheral surface of the shaft, the conductive grease is applied to at least a portion of an inner peripheral surface of the elastic body portion, the inner peripheral surface being an annular surface which faces an inner periphery side, the conductive grease is applied to the inner peripheral surface of the elastic body portion such that the conductive grease is present in at least a portion of an inter-lip space, which is an annular space formed by the inner peripheral surface of the elastic body portion, and a volume of the conductive grease is 40% or more and 80% or less of a capacity of the inter-lip space, for lowered impedance.

2. The sealing apparatus according to claim 1, wherein the tension force applying member is mounted on the lip portion at a position facing away from the lip contact end.

3. The sealing apparatus according to claim 1, wherein one end of the inter-lip space in a direction of the axis is the lip contact end.

4. The sealing apparatus according to claim 3, wherein the elastic body portion includes at least one dust lip in an annular shape about the axis, and another end of the inter-lip space is a portion of the dust lip.

* * * * *